March 10, 1925.

J. D. EHRMANN ET AL

DIGESTER BLOW VALVE

Filed Aug. 2, 1923

1,529,583

Inventors
J. D. Ehrmann,
H. W. Cleveland &
N. L. Bellinger
by Wilkinson & Gusta
Attorneys.

Patented Mar. 10, 1925.

1,529,583

UNITED STATES PATENT OFFICE.

JOHN D. EHRMANN, HARRY W. CLEVELAND AND DANIEL L. BELLINGER, OF WAUSAU, WISCONSIN, ASSIGNORS TO D. J. MURRAY MANUFACTURING CO., OF WAUSAU, WISCONSIN, A CORPORATION OF WISCONSIN.

DIGESTER BLOW VALVE.

Application filed August 2, 1923. Serial No. 655,308.

*To all whom it may concern:*

Be it known that we, JOHN D. EHRMANN, HARRY W. CLEVELAND, and DANIEL L. BELLINGER, citizens of the United States, residing at Wausau, in the county of Marathon and State of Wisconsin, have invented certain new and useful Improvements in Digester Blow Valves; and we do hereby declare the following to be a full, clear, and exact description of the invention, such as will enable others skilled in the art to which it appertains to make and use the same.

The present invention relates to improvements in digester blow valves used in paper mills and an object thereof is to provide an improved valve for this purpose which will be less expensive than the types now on the market, and which, on account of its improved design, will be much more durable in service.

Another object of the invention is to dispense with the grooves and ribs or other guiding devices ordinarily placed at the two sides of the valve body, these ribs and grooves rapidly wearing and becoming troublesome, the wear taking place rapidly on account of the combined chemical and abrasive action of the material passing through the valve at high velocity.

It is a further object of the invention to provide external means not subject to either abrasive or chemical action for preventing the valve stem from turning, the connection between the stem and valve disc preventing the latter from turning.

It is a still further object of the invention to provide a valve with thickness of metal proportionate to the wear which occurs in such valves at different points, and to so design the valve, that the replacements, which must most frequently be made, namely the disc and the valve seat, can be done most expeditiously and at a minimum cost to the user.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is an end view of a digester blow valve constructed according to the invention.

Figure 1:
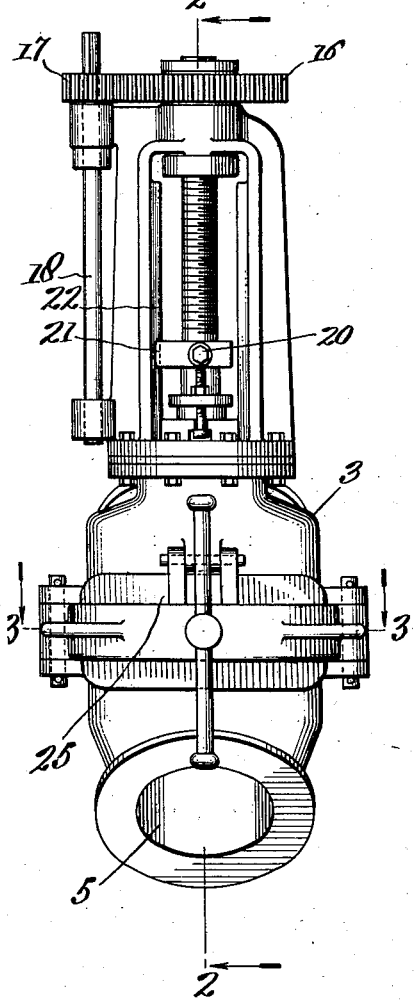
Figure 2:
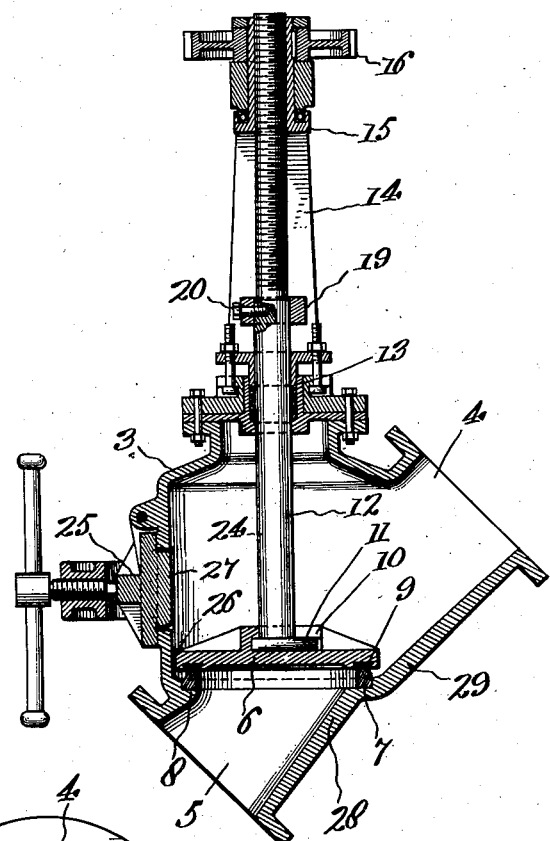
Figure 2 is a vertical section taken on the line 2—2 in Figure 1.
Figure 3:
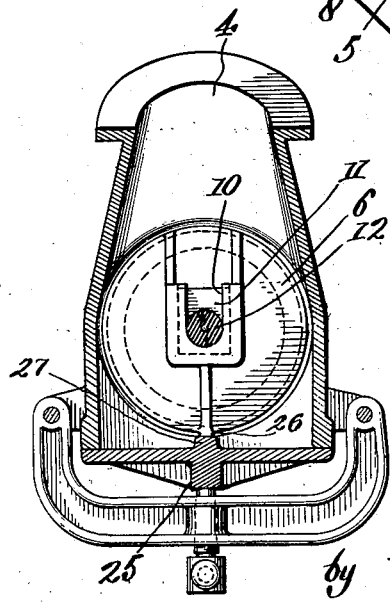
Figure 3 is a horizontal section taken on the line 3—3 also in Figure 1.

Referring more particularly to the drawings 3 designates the valve body which is of acid resisting bronze material, and within this valve body, which is hollow and provided with an inlet and outlet 4 and 5 on the angle shown best in Figure 2 is a disc valve 6 adapted to close against a ring seat 7 removably carried upon a shoulder 8 extending annularly and in a substantially horizontal plane at an intermediate point between the inlet and the outlet. The disc valve is provided with a face ring 9 embedded therein to take against the seating ring 7 in the closed position of the valve. Upon its upper side, the disc is provided with a usual form of socket 10 to receive the substantially rectangular foot 11 carried by the lower end of the valve stem 12 which passes up through a stuffing box 13 carried by the upper portion of the valve body and through a yoke 14 which is affixed upon the valve body. The upper portion of the valve stem 12 is threaded to receive a nut 15 carried in the upper part of the yoke and fixed to a gear wheel 16 which is rotated by the use of the pinion 17 meshing therewith and mounted upon a control shaft 18 journaled in appropriate bearings at the side of the yoke and parallel with the valve stem 12. A hand wheel may be directly mounted on the valve nut in place of the gears. The disc valve 6 is held from turning by the rectangular foot 11 on the lower end of the valve stem and the valve stem is in turn prevented from rotating by a collar 19 affixed to the stem as by the use of a cap screw 20 and having a forked projecting end 21 engaged with a guide rib or flange 22 on the inside of the top yoke 14.

Inasmuch as the discs wear rapidly and have to be replaced several times during the life of the valve, provision must be made for removing them easily. It is also impracticable to use any steel or iron inside of the valve. The design of the rectangular foot in combination with the slotted part of the valve disc enables the valve to be detached from the disc and access to the interior of the valve body for this purpose is permitted through a removable door 25.

According to our invention we propose to cast upon the valve disc 6 at a point adjacent the door 25 a small lug 26 which may be ground or filed to a small degree to enable it to clear the inside of the body casting. Thus it will not interfere with the movement of the disc nor allow the disc to move out of place while it is being raised past the door opening. In the door 25 we provide a rib 27 which engages the small lug 26, thus giving the lug a bearing continuously during the movement of the valve past the door opening.

The bronze valve seats 7 have also to be replaced from time to time and we have adopted a further simple design in which the valve ring 7 engages the shoulder 8 by a drive fit. The ring is made as light and cheap as practicable. The further advantage of this construction is that a long cold chisel may be inserted through the door opening and the seat ring 7 can be easily pried out, and the new one driven in place with a wooden block or rawhide mallet. The door opening is placed low enough relatively to the valve seat so that this operation can be easily performed.

During the blowing operation, the velocity of the pulp through the valve is of course very high, and the steam pressure behind the pulp is of course highest when the disc is being raised but is only part way up. An appreciable length of time is required to open the valve fully and during the period in which the disc, to some extent, opposes the flow of pulp, the latter is deflected against the opposite side of the valve body, on the discharge side of the seat, at very high velocity and in practice valves wear rapidly at this point. We therefore propose to increase the thickness at the points indicated by 28 and 29 approximately 66 percent above the thickness of the rest of the body.

The unit construction of the valve body permits the use of a minimum amount of high priced metal and a minimum amount of machine work in finishing.

The shaft 18 is either operated by hand wheel directly at the valve or by an extension shaft whereby this valve may be operated at a distance.

It is obvious that various changes and modifications may be made in the details of construction and design of the above specifically described embodiment of this invention without departing from the spirit thereof, such changes and modifications being restricted only by the scope of the following claims.

What is claimed is:—

1. A digester blow valve comprising a valve body having an inlet and outlet, a seat within said body, a valve mounted within said body and moving toward and from said seat, a door located at a low point in the front part of the valve body and adjacent said seat, a rib on the inside of the door, and a lug projecting from the peripheral edge of said valve at the front part thereof, said lug adapted to be engaged by the rib on said door.

2. An improved digester blow valve comprising a valve body having a shoulder at an intermediate part and inlet and outlet openings arranged angularly to the shoulder, portions of the body at opposite sides of said shoulder being increased in thickness, a seat ring detachably driven into said shoulder, a valve disc of acid resisting material in said body adapted to seat against said ring, a stem for opening and closing said valve, cooperative means carried by the valve and stem for preventing relative rotation thereof due to the flow of fluid through the valve, said disc further having a lug projecting from the forward part thereof, a door in the front part of said valve body being located at a low elevation with respect to said valve ring and having a rib upon the interior face of the door at substantially an intermediate point, said rib adapted to engage said lug upon the disc, and means to raise and lower said valve stem.

JOHN D. EHRMANN.
HARRY W. CLEVELAND.
DANIEL L. BELLINGER.